March 2, 1943. H. E. SOMES 2,312,597
HIGH PRESSURE QUENCHING METHOD AND FIXTURE
Filed Sept. 29, 1939 4 Sheets-Sheet 1
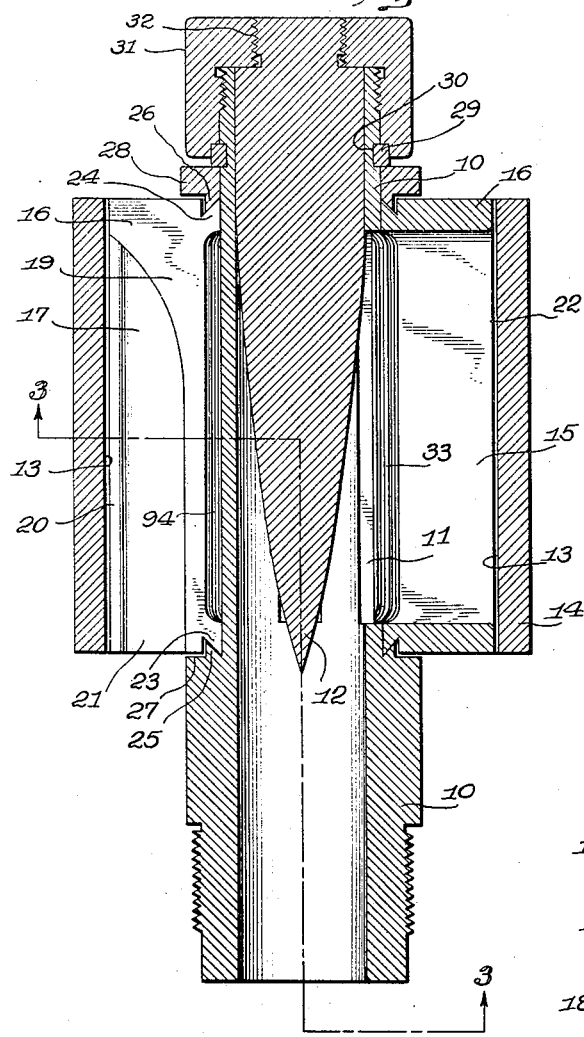
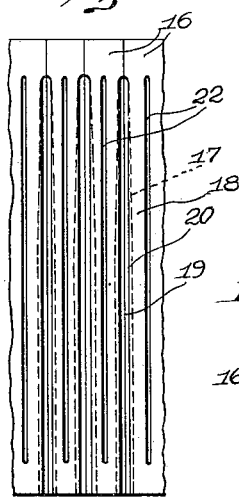
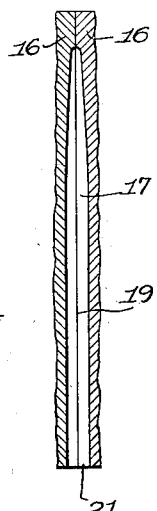
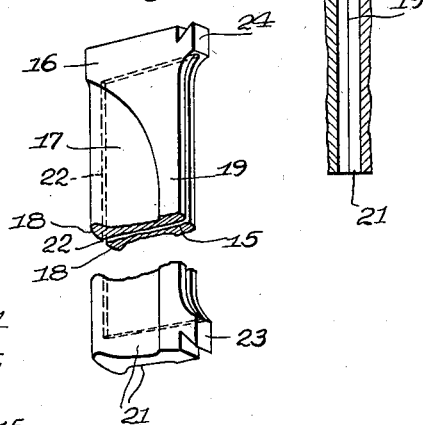
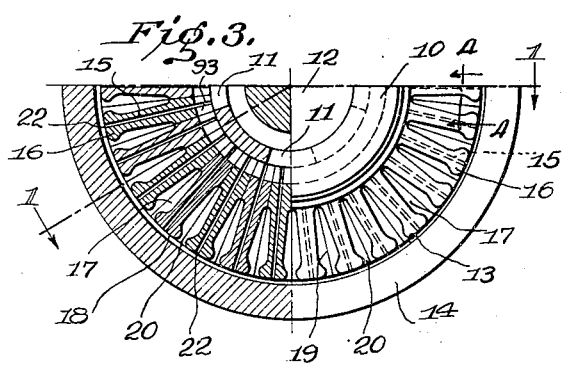
INVENTOR
Howard E. Somes
BY
ATTORNEY March 2, 1943. H. E. SOMES 2,312,597
HIGH PRESSURE QUENCHING METHOD AND FIXTURE
Filed Sept. 29, 1939 4 Sheets-Sheet 2
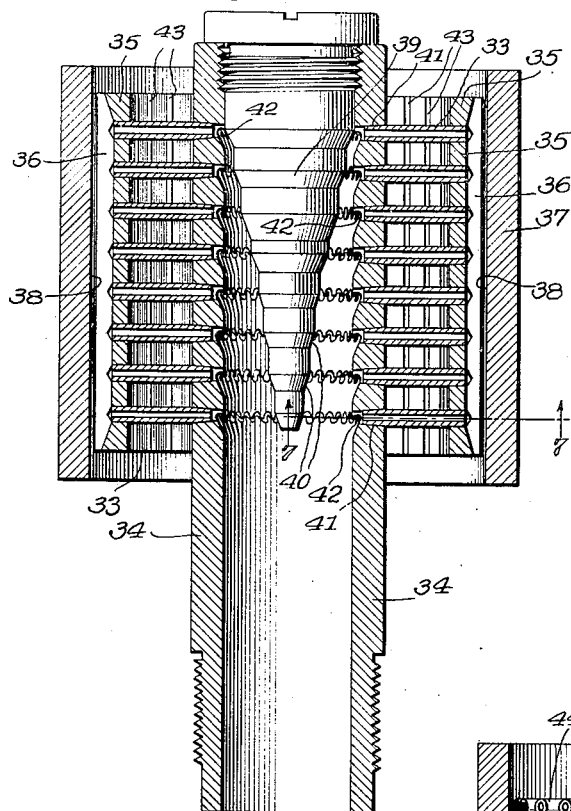
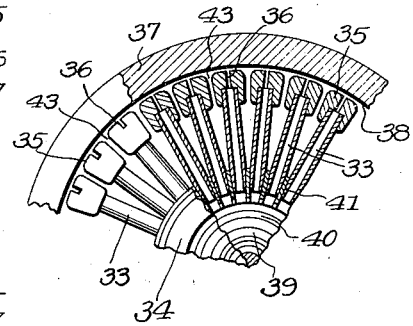
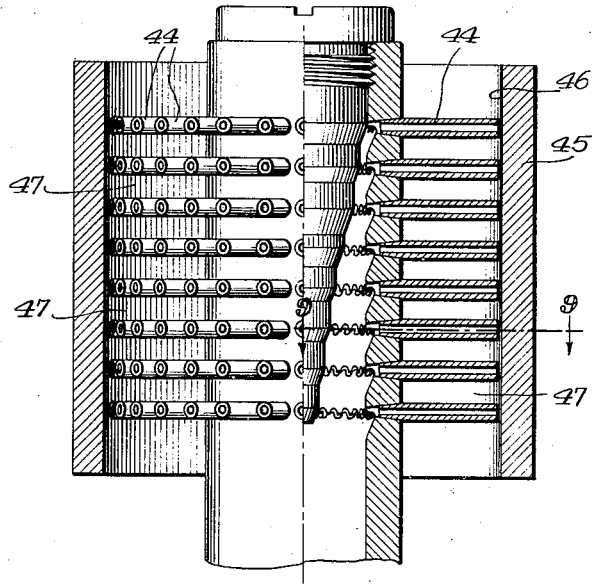
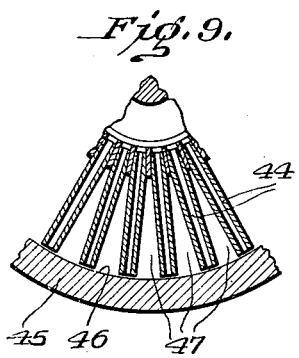
INVENTOR
Howard E. Somes
BY
ATTORNEY

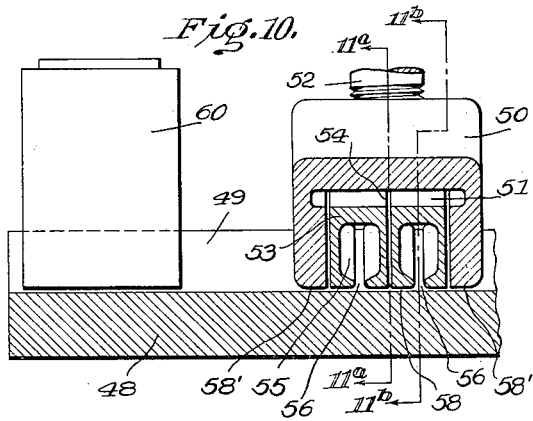
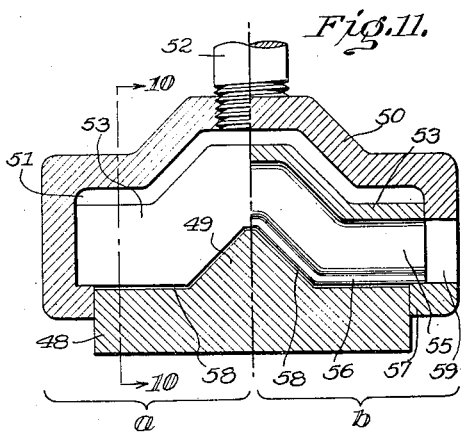
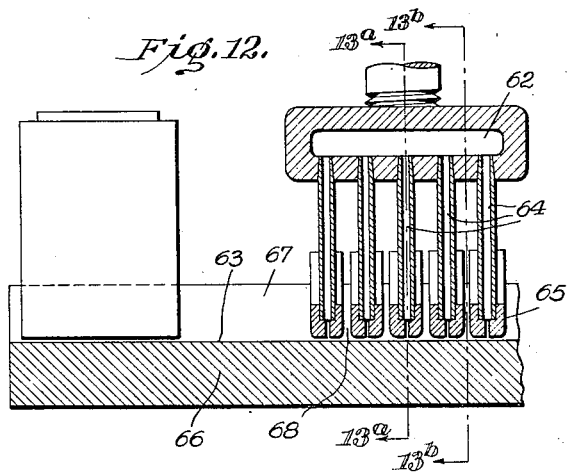
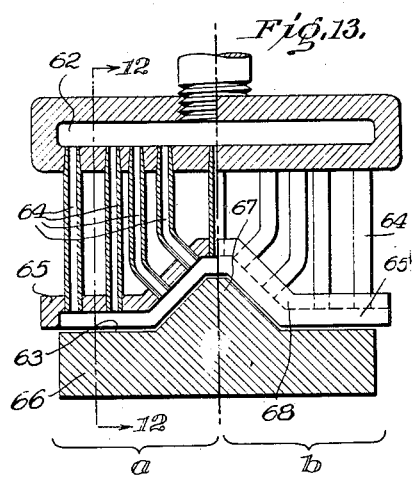
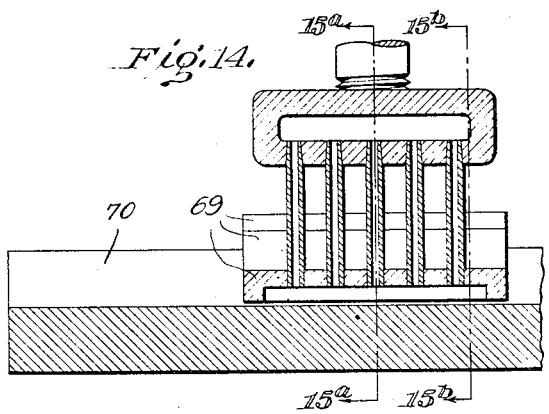
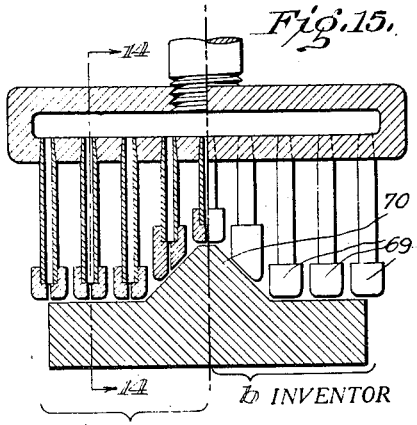

March 2, 1943. H. E. SOMES 2,312,597
HIGH PRESSURE QUENCHING METHOD AND FIXTURE
Filed Sept. 29, 1939 4 Sheets-Sheet 4
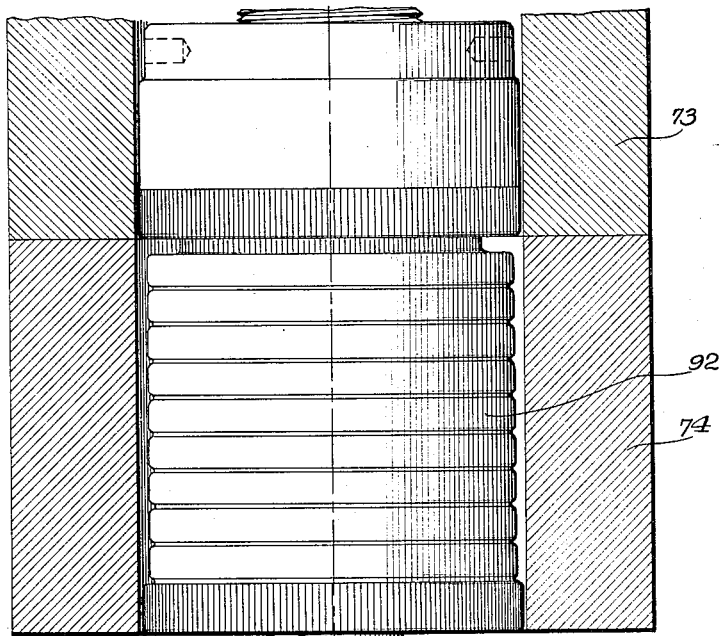
Fig. 16.
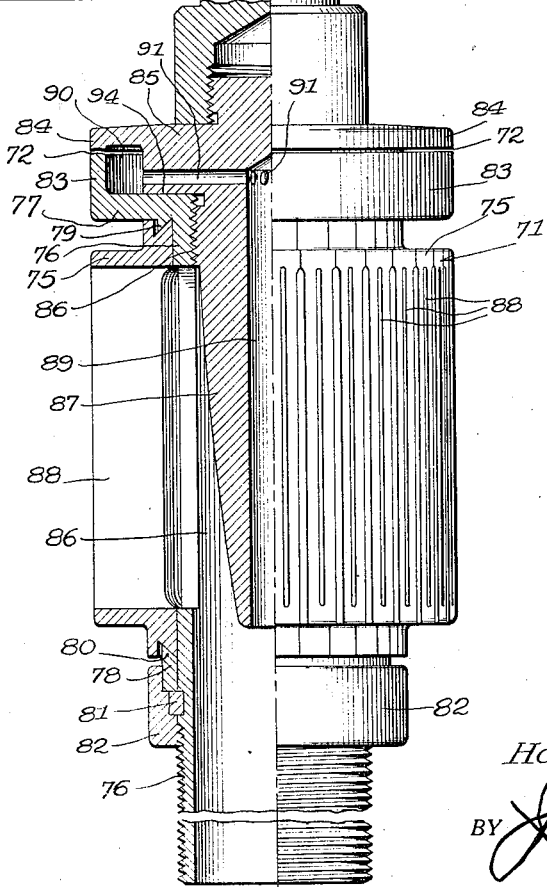
INVENTOR
Howard E. Somes
BY
ATTORNEY Patented Mar. 2, 1943

2,312,597

UNITED STATES PATENT OFFICE 2,312,597

HIGH PRESSURE QUENCHING METHOD AND FIXTURE

Howard E. Somes, Grosse Pointe Park, Mich., assignor to Budd Induction Heating, Inc., Philadelphia, Pa., a corporation of Michigan Application September 29, 1939, Serial No. 297,046

10 Claims. (Cl. 148—19.9)

The present invention relates, in general, to heat treatment of metals and more particularly to methods and means for quickly cooling or quenching the same after heating, to complete the heat treatment.

The chief object of the present invention is the provision of a method and apparatus for effecting individual, initial applications of quenching fluid simultaneously to a plurality of adjacent fractional areas distributed along two dimensions over the surface to be quenched, while preventing re-application of the same body of fluid to any other portions receiving similar individual application, and in a manner to enable a large volume of fluid per unit of time and area to be brought into contact with the surface to be quenched and at high pressure.

The improved method of the present invention is accomplished by effecting both application and withdrawal of the fluid to and from the surface to be quenched, in a direction substantially normal to the surface and simultaneously over relatively small adjacent unit areas distributed over the surface.

Apparatus capable of accomplishing such method and various other improved effects, is provided through a novel cooperative combination and arrangement of means for guiding the fluid over separate multiple paths to and from the adjacent unit areas, under pressure and at high velocity.

Various other objects and advantages of the invention will become apparent from a perusal of the following specification and the drawings accompanying the same.

In the drawings, in which like numerals indicate like elements:

Fig. 1 is a vertical, axial section of a quenching fixture embodying the invention;

Fig. 2 is a fragmentary view showing a portion of the side of the quenching fixture of Fig. 1;

Fig. 3 is a fragmentary bottom plan view partly in section on the line 3—3 of Fig. 1;

Fig. 4 is a fragmentary cross section taken on the line 4—4 of Fig. 3;

Fig. 5 is a perspective view partly in section showing one of the component radial elements of the quenching fixture;

Fig. 6 is a side elevation partly in section showing a modified form of the device;

Fig. 7 is a bottom plan view partly in section on the line 7—7 of Fig. 6;

Fig. 8 is a side elevation, partly in section, of a further modification;

Fig. 9 is a fragmentary section taken on the line 9—9 of Fig. 8;

Fig. 10 is a sectional view of a further modification taken on the line 10—10 of Fig. 11;

Fig. 11 is a sectional view taken partly on the lines 11a—11a and 11b—11b of Fig. 10 as indicated at a and b, respectively;

Fig. 12 is a sectional view of a further modification taken on the line 12—12 of Fig. 13;

Fig. 13 is a sectional view taken partly on the line 13a—13a and partly on the line 13b—13b of Fig. 12 as indicated at a and b, respectively;

Fig. 14 is a sectional view of a further modification taken on the line 14—14 of Fig. 15; and Fig. 15 is a sectional view taken partly on the line 15a—15a and partly on the line 15b—15b of Fig. 14, as indicated at a and b, respectively.

Fig. 16 is a combined form.

Referring to the drawings in detail and first to Figs. 1 to 5, the invention is here embodied in the form of a quenching fixture for quenching the inner surface of a hollow cylinder after the latter has been heated to the desired temperature in any known or other suitable manner as for example by electro-magnetic induction as disclosed in my prior application Serial No. 164,320 filed Sept. 17, 1937, for Induction heat-treating apparatus now Patent No. 2,281,331, issued April 28, 1942.

The present device comprises, in general, a tubular body member 10, forming the main fluid supply conduit provided with manifold distributing ports 11, in the side walls near its upper end, and a spreader element 12 for diverting the quenching fluid outwardly without turbulence against the inner surface 13 of a surrounding cylindrical object 14 to be quenched, the fluid passing outwardly through radially disposed fluid distributing channels 15 in the radial channel elements 16 intermediate which are arranged radially disposed discharge channels 17 formed partly in each of a pair of radial elements and arranged to conduct fluid away from the surface 13 in a direction substantially normal to such surface. Thus, the quenching fluid is directed in sheet or ribbon-like forms to and away from the surface to be quenched in separate multiple paths each over a definite, small fractional portion of the surface, the fluid being confined to form a layer of given thickness in its passage from the distributing channels to the collecting channels, by means of the flow-directing surface portions 18 at the peripheral extremities of the channel elements 16. The parts of the quenching fixture are proportioned relative to the cylinder 14 so as to afford but slight clearance between the peripheral extremity of the radial elements 16 and the inner surface of the cylinder 14, as shown so that the quenching fluid is forced into contact with the surface to be quenched during passage through an inclosure of short radial depth of which one wall is formed by a portion of the surface to be quenched, whereby separate bodies of quenching fluid are directed each over substantially one only of a plurality of different adjoining fractional areas of the surface.

The radial channel elements 16 are identical and of general sector shape to enable them to be fitted around the end portion of the main supply conduit element 10 with their juxtaposed flat side surface portions 19 in contact throughout so as to form between them the discharge channels 17 having intake slot openings 20 and outlet or discharge openings 21, the axially extending inlet slots 20 paralleling the axially extending end openings or slots 22 in the distributing elements 15.

The radial elements 16 are clamped in assembled position about the discharge end of the main supply conduit 10 by means of the undercut projections 23 and 24 engaging complementary annular projections 25 and 26, respectively, one carried on top of the shouldered portion 27 of the supply conduit 10 and the other on the bottom of the top clamping ring 28, held on the upper end of the conduit 10 in clamping relation with the distributing elements 16 by means of the spring-ring 29 engaged in an annular recess 30 in the conduit element 10. The distributing element 12 is secured in the end of the main conduit 10 by means of the cap element 31 threaded onto the end of the conduit element 10 and carrying the distributing element 12 by means of a threaded engagement therewith as indicated at 32.

In the use of the quenching fixture above described, the hollow cylindrical work-piece or the inner portion thereof having been raised to the desired temperature, the fixture and workpiece are brought into the position shown in Fig. 1 with the quenching fixture centered within the workpiece with slight clearance as shown, and a quenching fluid under suitable pressure supplied to the fixture through the shank of the tubular member 10 from a suitable source not shown.

The fluid coursing upwardly through the shank of the tubular body member 10 under pressure against the spreader 12 is diverted radially outwardly through the axially elongated manifold ports 11 into the annular distributing chamber 93 and out through the radial distributing channels 15 into the clearance space between the peripheral surface of the quenching fixture and the inner surface 13 of the workpiece 14. Because of the restricted clearance between the quenching fixture and the surface 13 and the close proximity of the relatively wide openings 32 of the discharge channels 17, substantially the entire body of fluid injected into the clearance space through each of the distributing channels 15, is discharged radially inwardly from the surface 13 through the openings 22 of the two adjacent discharge channels 17, the fluid during such passage being confined under pressure in contact with the surface 13 by the flow directing peripheral surface portions 18 of the radial elements 16. The warm fluid passing into the relatively large volume discharge channels discharges downwardly out of the quenching fixture through the discharge openings 21. Thus, the discharge of coolant away from the hot surface is effected substantially immediately after contact with the surface, under high pressure and without interference with the incoming fluid or the contact of a fresh body of fluid with the heated surface, and without repeated contact of the same body of warmed fluid with different parts of the surface.

It is to be understood that the coolant may be either a gas or a liquid, and that in either case it is to be used preferably under high pressure and high velocity. Where a liquid is used, and the coolant is forced over the hot surface in the manner described and at high pressure and high velocity the tendency is to hold the coolant in the liquid phase and to hold whatever vapor may be formed, under pressure and at reduced volume with consequent maintenance of a high quality of heat absorption and thermal conductivity in the coolant, resulting in maximum drasticity of quench.

The present invention affords the building up of of a pressure gradient of the coolant while it is in contact with the heated surface thereby raising the boiling point, where the coolant used is a liquid.

A further advantage is that by the use of a spreader element 12 and the use of the multiplicity of alternate distributing and discharge conduits, the coolant is forced to flow through predetermined paths without undesirable turbulence such as would take place in the usual form of quenching nozzle where the current of incoming fluid is interfered with by the discharge.

In referring to the following various modifications of the device, it will be apparent that all of them operate to apply the principle of directing the fluid directly to and away from the surface to be quenched in a direction substantially normal thereto in separate multiple paths over adjacent small fractional portions of the surface.

The modification shown in Figs. 6 and 7 is generally equivalent in structure and function and operates on substantially the same principle as that of the form above described except that, as to structure, it makes use of a multiplicity of separate radially extending distributing tubes 33 arranged in rows along the cylindrical tubular body member 34 each longitudinal row corresponding to one of the elongated channel elements of the preceding form. Each vertical row of the distributing tubes 33 is provided with a common axially elongated nozzle-terminal element 35 having a discharge slot 36 in communication with the channels in the distributing tubes 33, the parts being so proportioned and arranged in relation to the dimensions of the workpiece 37 that the peripheral surfaces of the terminal elements 35 will be presented to the inner surface 38 of the workpiece in close proximity thereto and in parallelism therewith. Mounted within the upper end of the cylindrical body portion 34 is a stepped spreader 39 having fluid diverting steps one at the level of each circular row of distributing tubes 33 and increasing in diameter toward the top of the fixture, to reduce the cross-sectional area of the inside of the fixture toward the top, the shouldered portions 40 of the steps being flared outwardly in the direction of flow so as to divert the fluid into the tubes 33 with minimum turbulence. The distributing tubes 33 are relatively thick-walled tubes tapered at the radially inner ends where they are inserted in openings 41 in the body member 34, the openings terminating on the inside of the body member in annular recesses 42, one for each row of tubes 33, the recesses 42 being somewhat scoop-shaped in section to intercept the fluid and direct it into the distributing tubes 33 with minimum turbulence.

To permit the cooling fluid to discharge freely, radially inwardly from the surface 38 without interfering with the supply of fresh fluid from the distributing tubes 33, the elongated terminal elements 35 are spaced slightly apart circumferentially as indicated in Fig. 7 to afford axially, inwardly extending discharge passages 43 (Fig. 7) between them, which discharge passages are of slightly greater volume than the terminal slots 36 and open in the space of still larger volume between the several radially extending distributing tubes 33. There is thus formed for the quenching fluid a free discharge path extending inwardly from the surface to be quenched and from points distributed between the points of initial contact of the fluid with the surface.

From the above, it will be seen that the embodiment shown in Figs. 6 and 7 operates in a manner very similar to that of the embodiment first described, and with similar results. The quenching fluid coursing upwardly through the hollow body member 34 and striking the sloping shoulders 40 of the spreader element 39 and the scoop-like annular recesses 42, is diverted radially outwardly through the several distributing tubes 33 to the nozzle terminal elements 35 and from the vertical slots 36 therein into the small clearance between the outer surface of the quenching fixture and the inner surface of the workpiece 37, where it impinges against the workpiece and is guided over the surface into the discharge channels 43 by means of the outer surface portions of the nozzle terminal elements 35.

The modification shown in Figs. 8 and 9 is similar to that of Figs. 6 and 7 except that the nozzle terminal elements 35 of the previous form are omitted and the tubular distributing elements 44 extended outwardly into close proximity to the inner surface of the workpiece 45 so that they all terminate in a cylindrical surface, between which and the surface 46 of the workpiece, there is substantially the same slight clearance provided for the other previous forms.

In the operation of the present form, with the coolant supplied under high pressure and at high velocity, the cross sectional area of the discharge path 47 between the distributing tubes 44 is so large in proportion to the cross sectional area of the space between the peripheral ends of the tubes 44 and the surface 46 that substantially the entire body of coolant issuing from each of the distributing tubes 44 is discharged radially inwardly through the adjacent surrounding discharge space 47, and without interference of the discharge flow with the incoming flow of fresh fluid. Thus, as in the preceding forms, drastic quenching is effected by forceful impingement of a multiplicity of separate bodies of quenching fluid against and over different adjacent fractional portions of the surface to be quenched, and without intermingling of the warm discharge fluid with the incoming cool fluid.

While the several above described forms of quenching fixture are arranged for quenching inside cylindrical surfaces it will be clearly understood, without the aid of further detailed disclosure, that without change in function, the parts may be altered in form and re-arranged to form a fixture for quenching the outside surface of a cylinder or other solid form.

In Figs. 10 and 11 is shown a modified embodiment of the invention adapted to the treatment of flat surfaces such as a lathe bed 48 with elevated track portion 49. Here the body member 50 takes the form of a rectangular hollow block having a manifold distributing chamber 51 to which the quenching fluid is supplied through a supply conduit 52. Within the body member 50 are mounted a series of distributing channel elements 53 corresponding to the radial distributing elements 16 of Fig. 1. The distributing elements 53 are spaced apart to form distributing channels 54 between each other and between the end ones and the adjacent sides of the body member 50, the channel elements 54 extending upwardly into communication with the manifold chamber 51 and downwardly to the lower terminal surface of the elements 53. Each of the distributing elements 53 is provided with a discharge chamber 55 extending longitudinally therethrough and opening out through the bottom surface of the element 53 through a discharge slot 56. The distributing elements 53 may be secured in the body member 50 in the spaced relation shown in any suitable manner as by brazing or welding, a portion 57 of the body member 50 at the lower right hand side thereof (Fig. 11) being arranged to be secured in place by brazing, welding, or bolting, after installation of the distributing elements 53, thus enabling the elements 53 to be readily positioned within the body member 50. The lower surfaces 58 and 58' of the distributing elements 53 and adjacent side portions of the body member 50, respectively, are given the cross-sectional contour of the bed and elevated track portion and arranged to be held in parallel spaced relation to leave a slight clearance between them and the lathe bed surface.

The various discharge chambers 55 are afforded outlet through outlet ports 59, provided in an end wall in the body member 50, in registering relation with the ends of the discharge chambers.

In the operation of the present modification, the lathe bed 48 having been heated to the proper hardening temperature in any suitable manner, preferably progressively, as by a traveling gas flame or suitable electro-magnetic induction heating element indicated diagrammatically at 60, the quenching fixture is progressed in trailing relation to the heating element 60 and sufficiently close thereto to be presented to a portion of the heated lathe bed surface while the latter is at the hardening temperature, quenching fluid being supplied under suitable high pressure and at high velocity through the supply conduit 52. The quenching fluid passing through the manifold chamber 51 is distributed through the distributing conduits 54 into the shallow clearance below the lower surface of the quenching fixture and the surface of the lathe bed, where the fluid is forced to pass over the surface of the lathe bed in its passage from the distributing channels 54 to the discharge slots 56 by the presence of the intervening extended surface portions 57 and 58. The fluid after entering the discharge chambers 55 has free discharge passage through the end wall of the fixture by way of the discharge ports 59.

The modification shown in Figs. 12 and 13 is similar to that described immediately above except that distribution of the quenching fluid from the manifold chamber 62 to the surface 63 of the lathe bed is effected through rows of separate distributing tube elements 64 extending downwardly from the manifold chamber 62 and terminating, each row, in a common elongated nozzle element 65 contoured in the direction of elongation to parallel the transverse contour of the lathe bed 66 and elevated track portion 67, and arranged and positioned to lie parallel and in spaced relation thereto with a slight uniform clearance. Each of the nozzle elements 65 is provided with a laterally extended flat bottom surface extending from each side of the slot opening for directing the flow of coolant from the slot along the surface 63 away from the slot opening and into the discharge passages 68 formed between the sides of the nozzle element and the sides of the next adjacent nozzle elements by the lateral spacing of the elements as indicated in Fig. 12. Part of the fluid supplied by the end nozzle elements will of course be discharged into the free space at the ends of the row. There is thus formed between the surface 63 and the flat extended bottom surfaces of the nozzle elements a restricted passage way with a multiplicity of discharge passages 68 so that the quenching fluid forced into the restricted clearance between the quenching fixture and the surface 63 is induced to be discharged upwardly and directly away from the surface through the several discharge passages 68 rather than to flow laterally along other portions of the surface 63 or to intermingle with the incoming fluid from other nozzle elements. The lathe surface 63 may thus be progressively quenched by a drastic quenching of a multiplicity of adjacent fractional areas, each by a separate body of quenching fluid, each separate body of fluid being forced to flow into and out of contact with the surface, under pressure and without intermingling with the other.

The modification shown in Figs' 14 and 15 is similar in all respects to that described immediately above except that the nozzle elements 69 are arranged to extend longitudinally of the raised track element 70 of the lathe bed.

Although the cylindrical type quenching fixtures shown in Figs. 1 to 9 are shown in operative relation with a workpiece commensurate in axial length with the length of the quenching fixture, it is to be understood that the fixture is also intended for operating progressively from end to end upon an elongated cylinder having an axial length greater than the length of the quenching fixture. It is also to be understood that in either case, it is preferable to effect relative rotary motion between the quenching fixture and the workpiece.

In progressive quenching it is highly important that initial application of the quenching medium with the heated portion of the workpiece take place simultaneously and uniformly over the entire front of approach of the progressive quenching step.

Fig. 16 shows a modification especially adapted to progressive quenching in that it provides for an initiation of the quenching step simultaneously and uniformly throughout an annular zone immediately following the heating of the workpiece and in lead of the main portion of the quenching fixture. Here the main portion 71 of the quenching fixture is of substantially the same construction as that of Figs. 1 to 5, in combination with an annular nozzle opening 72 arranged at the top of the fixture so as to move into and through the workpiece 73 in lead of the main portion upon relative axial movement of the workpiece and quenching fixture, the workpiece and quenching fixture being supported and guided for such relative movement in any known or other suitable manner as for example that shown in my copending application above-referred to. The workpiece 73 is of indefinite length and may be temporarily provided with end extensions such as the bottom end extension 74 of a material having electro-magnetic characteristics similar to that of the workpiece and out of which end piece the heating element 92 is moved progressively upwardly into and through the workpiece, the heating element moving up out of the workpiece into a similar top end extension or end piece not shown.

The quenching fixture 71, like that of Figs. 1 to 5, is built up of a plurality of radial channel elements 75 mounted about the tubular body member 76 between the upper annular radial extension 77 and the lower clamping ring 78, the elements 75 being held in place against outward radial displacement by the upper and lower annular projections 79 and 80 carried by the annular projection 77 and clamping ring 78, respectively. In the initial assemblage of the radial elements, the clamping ring 78 is held in engagement with the radial elements by means of a suitable split ring 81 sprung into an annular recess in the tubular body portion 76 after which the clamping ring 78 is clamped tightly against the radial elements by means of a cap ring 82 threaded onto the lower end of the tubular body member.

The annular radial extension 77 of the body member 76 is provided with an upwardly extending peripheral wall 83 whose top rim forms the lower wall of the annular nozzle opening 72, the upper wall of which is formed by an annular flange portion 84 on the upper nozzle element 85. The upper nozzle element 85 is threaded at 86 into the upper end of the tubular body member 76 and carries a distributing element 87 extending downwardly into the hollow body member 76. The distributing element 87 has its outer surface tapered downwardly for diverting the quenching fluid outwardly through the distributing channels 88, and is provided with a central channel 89 opening at its lower end into communication with the interior of the hollow body portion 76, and communicating with the annular manifold distributing channel 90 for the nozzle opening 72 through a plurality of radial channels one of which is shown at 91. Abutment of the upper nozzle element 85 with the annular flange element 77 at their abutting surfaces 94 determines the width of the annular nozzle opening 72, which width may be varied, if desired, by the use of suitable shim gaskets not shown.

While any form of heating element may be used, an induction heating element, such as that disclosed in my copending application above-referred to, is here indicated as preferable for progressive heating. In general, it is desirable that the end pieces such as the lower end piece shown at 74 is of material of substantially or nearly the same physical characteristics as the material of the workpiece 73 inasmuch as its purpose is to act temporarily as an extension of the workpiece to form a temporary end therefor, and thus avoid end effects taking place in the true end of the workpiece. The end piece also serves to form an extension of the workpiece into which the heating element may pass such that where the heating element is an electro-magnetic induction device, the electro-magnetic reactions thereon of the workpiece will be simulated and continued by the end piece 74, at least to the extent necessary to avoid undesirable variations in the electrical reactances of the heating element. For example, where the workpiece is of magnetic material, the end pieces should be of magnetic material of substantially the same or even higher permeability, although not of the same metallurgic qualities or electrical conductivity. For example to reduce electrical losses therein the end piece may be built up of radial laminations or formed of some electro-magnetic material capable of reaching a high temperature without loss of its magnetic qualities and capable of being repeatedly heated and cooled without objectionable physical changes such as shrinking or warping.

The operation of the modification shown in Fig. 16 will be obvious from the above description. However, the following general description of the operation will make clear certain of its advantages.

With the heating element 92 energized and relative motion effected between the heating element and the workpiece to provide relative axial movement between the workpiece and the heating element and quenching fixture, preferably by movement of the workpiece down over the heating element and quenching fixture, the heating coil and quenching fixture 71 are caused to move relatively upwardly through the bottom end piece 74 and workpiece 73 passing upwardly out of the workpiece through a top end piece not shown but similar in all respects to the bottom end piece 74. The heating element 92 passing through the workpiece 73 produces within the workpiece near and including the inner surface a progressing heated zone, heated to the hardening temperature with equithermal lines lying in planes substantially normal to the axis. Thus, the continuous annular jet of quenching fluid issuing from the annular nozzle 72 of the quenching fixture following the heating element upwardly through the workpiece moves progressively in trailing relation to the equithermal line of hardening temperature and substantially parallel thereto, with the result that initial quenching takes place uniformly and simultaneously throughout an equithermal line, followed by a subsequent or secondary quenching or drenching over an axially extended surface to further reduce the temperature of the workpiece.

From the above it will be understood that the important desideratum is that the line of initial quenching should parallel the line of extension of the heated zone, so that if the heated zone be not in a plane substantially perpendicular to the axis, for example should it deviate above or below a given plane, then the annular nozzle 72 should be arranged to maintain parallelism with such a deviating line of extension of the heated zone.

As shown in Figs. 1 to 8 inclusive, the supply conduits are angularly spaced but a few degrees apart and substantially less than 15°. The drawings also show that the quenching liquid passages along which the liquid flows in opposite directions from a supply conduit and generally parallel to the work surface is not substantially smaller than the cross-sectional area of the supply conduit, whereby a reduction in pressure occurs as the liquid moves over the work surface to the outlet passages.

While I have herein shown and described certain preferred embodiments of my invention for the sake of disclosure, it is to be understood that the invention is not limited to the specific embodiments shown, but contemplates all such modifications and variants thereof as fall fairly within the scope of the appended claims.

What I claim is:
1. Apparatus for heat treating a portion of an object near and including a cylindrical surface progressively in a given axial direction comprising, means for heating said portion to hardening temperature progressively in said given axial direction, to produce in said portion a progressing annular zone heated to the hardening temperature, means adjacent said heating means for ejecting a jet of fluid at an acute angle away from said heating means against the surface of said portion in a continuous line extending around the cylinder parallel to an equithermal line passing through the zone of hardening temperature, and means for ejecting a plurality of jets of fluid against different adjacent fractional portions of an axially extended zone adjacent said first-named jet and remote from said heating means and in trailing relation to said continuous line jet, said last mentioned means having a tendency to direct quenching fluid toward the heating member, which tendency is opposed by said first mentioned jet means.

2. A quenching fixture for quenching a cylindrical surface of an object progressively in a given direction comprising a preliminary quenching nozzle arranged to eject a jet a fluid against said surface lying in a continuous line around the surface in a plane transverse to the axis and to be relatively moved progressively axially over the surface in said given direction, and a secondary quenching nozzle arranged to eject a plurality of jets of fluid around over a portion of the cylindrical surface of substantial axial extent in trailing relation and adjacent to said preliminary quenching nozzle and substantially normal to the surface, said preliminary nozzle being adapted to direct said jet in an acute angle to the surface quenched and towards said secondary drenching nozzle.

3. A quenching fixture comprising a plurality of centrally slotted and side recessed radially arranged segmental members forming a continuous annulus, a central hollow support for said members, and means on said support for securing said members thereon arranged in a substantially continuous annulus, ports in said hollow support for connecting the support to the slots of said members, and recesses formed by adjacent members extending axially to the end of the members.

4. The method of quenching the surface of a heated article which comprises directing a plurality of substantially uniformly spaced main streams of quenching fluid under high pressure into impingement with the article surface from a point closely adjacent thereto, substantially normal thereto and at substantially uniformly spaced parallel regions of predetermined extent, causing each such main stream upon impingement with said surface to divide and flow in closely confined and restricted oppositely directed branch paths of substantial extent adjacent and in contact with said surface, then bringing the streams of adjacent branch paths together and causing them to flow in confined and restricted low-pressure exhaust paths away from said surface.

5. The method of quenching the inner surface of a heated tubular article which comprises directing a plurality of substantially uniformly circumferentially spaced, longitudinally elongated, radial main streams of quenching fluid under high pressure into impingement with said surface from a point closely adjacent thereto and substantially normal thereto, causing each such main stream upon impingement with said surface to divide and flow in closely confined and restricted oppositely directed circumferential branch paths of substantial extent adjacent and in contact with said surface, then bringing the streams of adjacent branch paths together and causing them to flow in confined and restricted low-pressure exhaust paths away from said surface.

6. A quenching head comprising a member having a longitudinal surface terminating in transversely extending end surfaces, a quenching fluid-receiving chamber therein spaced from said longitudinal surface, a plurality of relatively narrow longitudinally elongated, substantially uniformly spaced, discharge passages extending from said chamber through said longitudinal surface, and a plurality of longitudinally elongated passages of a width at least as great as said discharge passages for reentrant quenching fluid, each being between, parallel to and longitudinally coextensive with a pair of adjacent discharge passages and extending from said longitudinal surface for a portion only of the distance between said longitudinal surface and said chamber and opening through one of said end surfaces.

7. A quenching device comprising a generally cylindrical member having an outer peripheral surface, an internal axial quenching fluid-receiving passageway, a plurality of radially extending passages and a plurality of longitudinally extending passages, said radially extending passages being substantially uniformly circumferentially spaced and extending from said internal passageway through said peripheral surface for discharging quenching fluid from said passageway, and said longitudinally extending passages being disposed in said member between adjacent radially extending passages and opening through both said peripheral surface and through one end of the device for conducting re-entrant quenching fluid discharged from said radially extending passage between each pair of radially end of said member.

8. A quenching device comprising a generally cylindrical member having an outer peripheral surface, end surfaces, an internal quenching fluid-receiving passageway, and a plurality of radially extending and longitudinally extending passages, said radially extending passages being narrow and of many times greater length than width and extending from said internal passageway through said peripheral surface for discharging a plurality of ribbon-like streams of quenching fluid from said internal passageway, and said longitudinally extending passages being of a width at least as great as the width of said radially extending passages, and extending continuously from adjacent one of said end surfaces through said peripheral surface and through a portion of the radial extent of the other of said end surfaces, there being one such longitudinally extending passages between each pair of radially extending passages.

9. A quenching device comprising a plurality of radially tapered elements forming a continuous annulus, a tubular support, and means on said support for securing said members thereto, said support being adapted to conduct quenching fluid to within said annulus, each of said elements having a narrow longitudinally elongated radial passage extending completely therethrough, and each of said elements having longitudinal recesses in the sides thereof extending through one of its ends and radially inwardly from the outer periphery of said annulus for a portion of its radial depth whereby to form with the corresponding recesses of adjacent elements passages opening through the periphery and one end of said annulus.

10. A quenching fixture for progressively quenching a peripheral surface of a cylindrical workpiece, comprising a generally cylindrical quench discharging head having leading and trailing ends, a substantially continuous circumferential discharge passage adjacent said leading end for discharging a substantially solid annular stream of quenching fluid at an acute angle away from said leading end, and a plurality of substantially parallel, substantially equally spaced, longitudinally extending discharge passages intermediate said circumferential discharge passage and said trailing end for discharging substantially equally spaced longitudinally radial sheets of quenching fluid, said head having a quenching fluid-receiving chamber therein common to all of said passages for conducting quenching fluid thereto.

HOWARD E. SOMES.